United States Patent
Anthamatten et al.

(10) Patent No.: US 10,377,852 B2
(45) Date of Patent: Aug. 13, 2019

(54) SHAPE-MEMORY POLYMERS AND METHODS OF MAKING AND USE THEREOF

(71) Applicants: Mitchell Anthamatten, Rochester, NY (US); Christopher L. Lewis, Rochester, NY (US); Yuan Meng, Rochester, NY (US)

(72) Inventors: Mitchell Anthamatten, Rochester, NY (US); Christopher L. Lewis, Rochester, NY (US); Yuan Meng, Rochester, NY (US)

(73) Assignee: The University of Rochester, Rochester, NY (US)

( * ) Notice: Subject to any disclaimer, the term of this patent is extended or adjusted under 35 U.S.C. 154(b) by 99 days.

(21) Appl. No.: 15/551,983

(22) PCT Filed: Feb. 19, 2016

(86) PCT No.: PCT/US2016/018720
§ 371 (c)(1),
(2) Date: Aug. 18, 2017

(87) PCT Pub. No.: WO2016/134286
PCT Pub. Date: Aug. 25, 2016

(65) Prior Publication Data
US 2018/0086878 A1    Mar. 29, 2018

Related U.S. Application Data

(60) Provisional application No. 62/118,106, filed on Feb. 19, 2015.

(51) Int. Cl.
| | | |
|---|---|---|
| *C08G 63/688* | (2006.01) | |
| *C08G 63/08* | (2006.01) | |
| *C08G 63/91* | (2006.01) | |
| *G01L 5/00* | (2006.01) | |
| *C08G 63/47* | (2006.01) | |

(52) U.S. Cl.
CPC ......... *C08G 63/6882* (2013.01); *C08G 63/08* (2013.01); *C08G 63/47* (2013.01); *C08G 63/912* (2013.01); *G01L 5/0095* (2013.01); *C08G 2250/00* (2013.01)

(58) Field of Classification Search
None
See application file for complete search history.

(56) References Cited

U.S. PATENT DOCUMENTS

| | | |
|---|---|---|
| 6,114,499 A | 9/2000 | Kazmaier et al. |
| 2007/0148465 A1 | 6/2007 | Shimura et al. |
| 2008/0319132 A1* | 12/2008 | Lendlein ............ C08G 18/4018 525/123 |

FOREIGN PATENT DOCUMENTS

DE    102008055870    5/2010

OTHER PUBLICATIONS

Lewis, C.L. et al., "Well-Defined Shape-Memory Networks with High Elastic Energy Capacity", Macromolecules, vol. 48, No. 14, Jul. 28, 2015, pp. 4918-4926.
Michal, B.T. et al., "Inherently Photohealable and Thermal Shape-Memory Polydisulfide Networks", ACS Macro Letters / American Chemical Society, vol. 2, No. 8, Aug. 20, 2013, pp. 694-699.
International Search Report and Written Opinion dated Aug. 17, 2016, from International Application No. PCT/US2016/018720, 17 pages.

* cited by examiner

*Primary Examiner* — Christopher M Rodd
(74) *Attorney, Agent, or Firm* — Meunier Carlin & Curfman LLC

(57) ABSTRACT

Described are shape-memory polymers that have a branched or telechelic prepolymer having a low polydispersity crosslinked with a stoichiometric amount of a multifunctional crosslinker. Also described are methods of making shape-memory polymers by crosslinking a stoichiometric amount of a multifunctional crosslinker with a branched or telechelic prepolymer having a low polydispersity. Methods of measuring the energy storage capacity of a shape-memory polymer are also disclosed.

18 Claims, 8 Drawing Sheets

SHAPE-MEMORY POLYMERS AND METHODS OF MAKING AND USE THEREOF

CROSS-REFERENCE TO RELATED APPLICATIONS

This application is a 371 U.S. National Stage of International Application No. PCT/US2016/018720, filed Feb. 19, 2016, which claims the benefit of priority to U.S. Provisional Application No. 62/118,106, filed Feb. 19, 2015, each of which are hereby incorporated herein by reference in their entireties.

BACKGROUND

Shape-memory polymers (SMPs) form a class of materials that can store and release elastic energy upon applying an external stimulus, such as heat or light. A shape-memory material can be deformed to a temporary shape and can return to its original shape after the application of an external stimulus, such as temperature. For example, a material heated above its shape-memory transition temperature, $T_{SM}$, can be elastically deformed by subjecting it to external stresses and subsequently cooled, while under stress, beneath $T_{SM}$. In the cooled state, external stresses can be removed and the material can retain its deformed shape. Upon heating above $T_{SM}$, the material can recover its elastic strain energy and can return to its original shape. SMPs are noted for their ability to recover from large strains—up to several hundred percent—which can be imposed by mechanical loading. The large-strain recovery Observed in SMPs is a manifestation of entropy elasticity.

SMPs can serve in biomedical devices such as vascular stents, clot-removal devices, catheters, programmable sutures, implants, and numerous other applications. Applications increasingly demand that shape-memory materials perform mechanical work against external loads; therefore, SMPs, in certain circumstances, should be able to store large amounts of elastic energy per unit volume, or equivalently should exhibit high shape energy densities, which are seldom measured (Anthamatten, M et al. *Macromolecules* 2013, 46(10), 4230-4234). Other commercialization requirements are diverse but may include: (i) a specified shape recovery stimulus (heat, light, chemical)—for thermal stimulus, a tunable shape recovery temperature, $T_{SM}$, near the body's temperature is often needed; (ii) ease of processability into different shapes; (iii) reproducible and robust shape-memory behavior upon cycling; (iv) and low cost and straightforward scale-up. What are thus needed are new SMP's and methods of making and using them. The methods and compositions disclosed herein address these and other needs.

SUMMARY

In accordance with the purposes of the disclosed methods, as embodied and broadly described herein, the disclosed subject matter relates to compositions and methods of making and using the compositions. More specifically, according to the aspects illustrated herein, there are provided shape-memory polymers and methods of making shape-memory polymers.

According to further aspects illustrated herein, shape-memory polymers are provided. The disclosed shape-memory polymers can comprise a branched or telechelic prepolymer having low polydispersity and crosslinks with a multifunctional crosslinker, wherein substantially none of the crosslinks are the reaction product of a free radical addition reaction. In some examples, the disclosed shape-memory polymers can comprise radical scavengers. In many examples, herein the crosslinks are formed by a Michael addition reaction.

Also disclosed herein are methods of making shape-memory polymers. The disclosed methods can comprise, for example, crosslinking a stoichiometric amount of a multifunctional crosslinker with a branched or telechelic prepolymer having a low polydispersity in the substantial absence of free radicals. The disclosed methods can also be performed in the presence of a radical scavenger.

Also disclosed herein are methods of measuring the energy storage capacity of a shape-memory polymer. The disclosed methods can comprise stretching a shape-memory polymer from an unstretched length to a post-stretched length, wherein stretching comprising applying a load; maintaining the shape-memory polymer at the post-stretched length for a first time; heating the shape-memory polymer at the post-stretched length for a second time; removing the load from the shape-memory polymer at the post-stretched length at an unloading rate; collecting a plurality of force measurements of the shape-memory polymer as the load is removed; collecting a plurality of length measurements of the shape-memory polymer corresponding to each of the force measurements; generating a force over length curve based on the force measurements and length measurements of the shape-memory polymer as the load is removed; and analyzing the force over length curve to determine the energy storage capacity of the shape-memory polymer.

Additional advantages will be set forth in part in the description that follows or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

Figure 1:
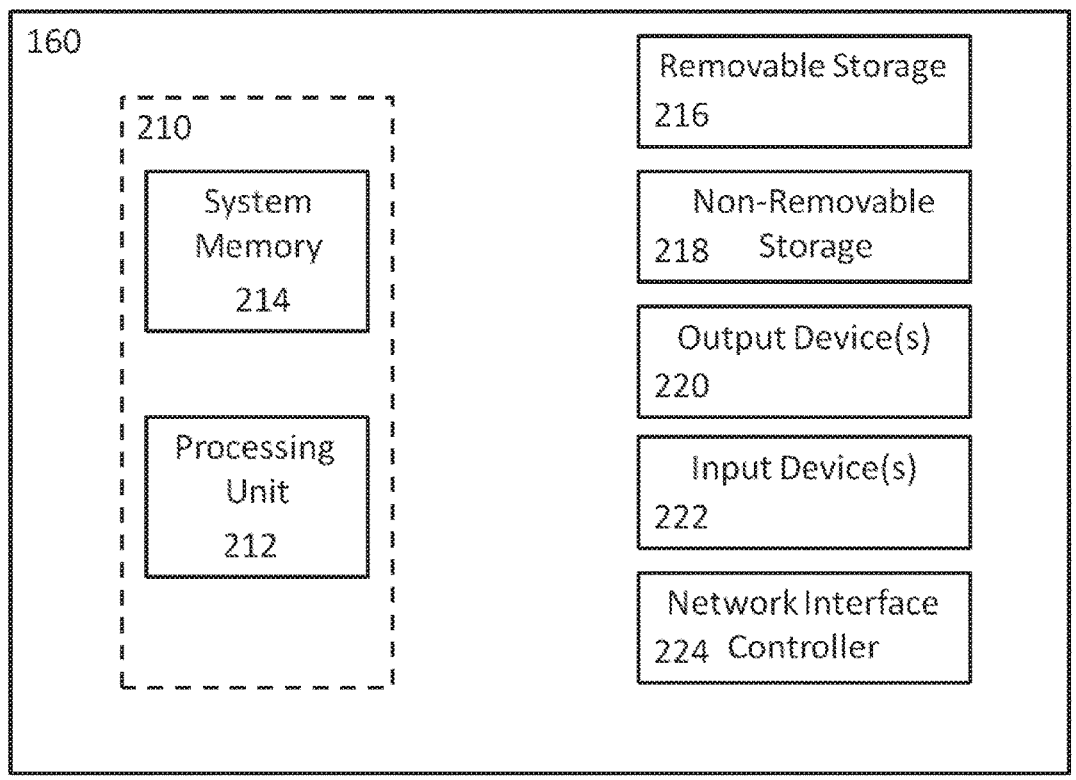
FIG. 1 is a schematic of an exemplary processing device.

The methods and compositions described herein may be understood more readily by reference to the following detailed description of specific aspects of the disclosed subject matter and the Examples included therein.

Before the present methods and compositions are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

By "substantially the same" is meant the values are within 5% of one another, e.g., within 3%, 2% or 1% of one another.

By "substantially none of the crosslinks" is meant less than 2.0% of the crosslinks (i.e., bonds formed between the branched or telechelic prepolymer and multifunction crosslinker) are the result of a free radical polymerization reaction. For example, the disclosed compositions can be have less than 1.5%, 1.0%, 0.5%, or 0.1% of their crosslinks being the result of a free radical polymerization reaction.

By "substantial absence of free radicals" is meant the concentration of added free radical initiators is less than 0.01 g/cm$^3$.

As used herein, "molecular weight" refers to number-average molecular weight, unless clearly indicated otherwise.

Disclosed herein are shape-memory polymers. The disclosed shape-memory polymers can comprise a branched or telechelic prepolymer having a low polydispersity crosslinked with a stoichiometric amount of a multifunctional crosslinker.

The term "branched prepolymer" is used herein to refer to a branched polymer before it has undergone crosslinking as disclosed herein. It is not meant to imply that the branched prepolymer is not yet a polymer (e.g., a monomer or polymer precursor). Rather a branched prepolymer is meant to refer to a branched polymer that has reactive groups that are available for bond forming reactions that will crosslink (inter and/or intramolecular crosslink). In some examples, the branched prepolymer can comprise 3 or more branches (e.g., 4 or more, 5 or more; 6 or more, 7 or more, 8 or more, or 9 or more). In some examples, the branched prepolymer can comprise 10 or less branches (e.g., 9 or less, 8 or less, 7 or less, 6 or less, 5 or less, or 4 or less). The number of branches in the prepolymer can range from any of the minimum values described above to any of the maximum values described above, for example from 3 to 10 (e.g., from 3 to 7, from 7 to 10, or from 4 to 9).

The term "telechelic prepolymer" is used herein to refer to a compound, including a polymer, that is functionalized at each end of the molecule and thus can enter into polymerization or other reactions through its functionalized, reactive end-groups.

The terms "low polydispersity" and "substantially monodisperse" are used interchangeably to refer to a polydispersity index, defined as the ratio of the weight average molecular weight to the number average molecular weight, of from 1 to 1.5. In some examples, each branch of the branched prepolymer is substantially the same molecular weight. In other words, in some examples within each branched prepolymer the branches have a low polydispersity. The molecular weight of each branch of the branched prepolymer can be below the entanglement molecular weight. For example, the molecular weight of each branch of the branched prepolymer can be 10,000 grams per mole (g/mol) or less (e.g., 9,500 g/mol or less; 9,000 g/mol or less; 8,500 g/mol or less; 8,000 g/mol or less; 7,500 g/mol or less; 7,000 g/mol or less; 6,500 g/mol or less; 6,000 g/mol or less; 5,500 g/mol or less; 5,000 g/mol or less; 4,500 g/mol or less; 4,000 g/mol or less; 3,500 g/mol or less; 3,000 g/mol or less; 2,500 g/mol or less; 2,000 g/mol or less; or 1,500 g/mol or less). In some examples, the molecular weight of each branch of the branched prepolymer can be 1,000 g/mol or more (e.g., 1,500 g/mol or more; 2,000 g/mol or more; 2,500 g/mol or more; 3,000 g/mol or more; 3,500 g/mol or more; 4.000 g/mol or more; 4,500 g/mol or more; 5,000 g/mol or more; 5,500 g/mol or more; 6,000 g/mol or more; 6,500 g/mol or more; 7,000 g/mol or more; 7,500 g/mol or more; 8,000 g/mol or more; 8,500 g/mol or more; 9,000 g/mol or more; or 9,500 g/mol or more). The molecular weight of each branch of the branched prepolymer can range from any of the minimum values described above to any of the maximum values described above, for example from 1,000 g/mol to 10,000 g/mol (e.g., from 1,000 g/mol to 5,000 g/mol, from 5,000 g/mol to 10,000 g/mol, from 1,000 g/mol to 2,00 g/mol; from 2,00 g/mol to 5,000 g/mol; from 5,000 g/mol to 7,500 g/mol; from 7,500 g/mol to 10,000 g/mol; from 3,000 g/mol to 8,000 g/mol, from 4,000 g/mol to 9,000 g/mol; from 5,000 g/mol to 8,000 g/mol; from 6,000 g/mol to 7,000 g/mol; or from 6,500 g/mol to 7,000 g/mol).

In other examples, the molecular weight of the telechelic prepolymer can be 10,000 grams per mole (g/mol) or less (e.g., 9,500 g/mol or less; 9,000 g/mol or less; 8,500 g/mol or less; 8,000 g/mol or less; 7,500 g/mol or less; 7,000 g/mol or less; 6,500 g/mol or less; 6,000 g/mol or less; 5,500 g/mol or less; 5,000 g/mol or less; 4,500 g/mol or less; 4,000 g/mol or less; 3,500 g/mol or less; 3,000 g/mol or less; 2,500 g/mol or less; 2,000 g/mol or less; or 1,500 g/mol or less). In some examples, the molecular weight of the telechelic prepolymer can be 1,000 g/mol or more (e.g., 1,500 g/mol or more; 2,000 g/mol or more; 2,500 g/mol or more; 3,000 g/mol or more; 3,500 g/mol or more; 4,000 g/mol or more; 4,500 g/mol or more; 5,000 g/mol or more; 5,500 g/mol or more; 6,000 g/mol or more; 6,500 g/mol or more; 7,000 g/mol or more; 7,500 g/mol or more; 8,000 g/mol or more; 8,500 g/mol or more; 9,000 g/mol or more; or 9,500 g/mol or more). The molecular weight of the telechelic prepolymer can range from any of the minimum values described above to any of the maximum values described above, for example from 1,000 g/mol to 10,000 g/mol (e.g., from 1,000 g/mol to 5,000 g/mol, from 5,000 g/mol to 10,000 g/mol, from 1,000 g/mol to 2,00 g/mol; from 2,00 g/mol to 5,00 g/mol; from 5,000 g/mol to 7,500 g/mol; from 7,500 g/mol to 10,000 g/mol; from 3,000 g/mol to 8,000 g/mol, from 4,000 g/mol to 9,000 g/mol; from 5,000 g/mol to 8,000 g/mol; from 6,000 g/mol to 7,000 g/mol; or from 6,500 g/mol to 7,000 g/mol).

In some examples, the branched or telechelic prepolymer used herein can comprise a semi-crystalline polymer. Examples of semi-crystalline polymers include, but are not limited to, polyethylene, polyethylene terephthalate, polytetrafluoroethylene, isotactic polypropylene, polyphenylene sulfide, polyetherketone, polyetheretherketone, polyphthalamide, polyetherketoneketone, thermoplastic polyimide, polybutylene terephthalate, polyoxymethyllene, nylon, polyesters, and poly(caprolactone). In some examples, the branched or telechelic prepolymer used herein can comprise a polymer that can undergo stress and/or strain induced crystallization. Examples of polymers that can undergo stress and/or strain induced crystallization include, but are not limited to, natural rubber, polyisoprene, poly(chloroprene), polyethylene glycol, poly(tetrahydrofuran), and poly(caprolactone). In some specific examples, the branched or telechelic prepolymer can comprise poly(caprolactone).

The branched or telechelic prepolymer has reactive groups that are available for bond formation; that is, the branched or telechelic prepolymer can be crosslinked when the reactive groups on separate branched or telechelic prepolymers or on the same branched or telechelic prepolymer form a bond with the reactive groups of the multifunctional crosslinker. Examples of reactive groups on a suitable branched or telechelic prepolymer include nucleophilic groups or electrophilic groups. Specific examples of nucleophilic reactive groups include thiols (sulfide), amines, azides, nitrites, alcohols (alkoxide), peroxides, carboxylic acids (carboxylate), thiocarboxylic acids (thiocarbonate), sulfonic acids (sulfoxide), and phosphonic acids (phosphates), where the deprotonated form of the reactive group is noted in parenthesis. Enolates can also be suitable nucleophilic reactive groups.

Specific examples of electrophilic reactive groups can comprise ketones, aldehydes, alkenes, acyl halides, acrylates, carboxylic acids, esters, hemiacetal, acetals, hemiketal, ketal, orthoesters, amides, imines, imides, azo compounds, cyanates, thiocyanates, nitrates, nitriles, nitrites, thiols, phosphines, and phosphodiesters. In some examples, the electrophilic reactive groups can comprise a Michael acceptor, which is an $\alpha,\beta$-unsaturated carbonyl, e.g., a (meth)acrylate group or allyl group.

Other suitable reactive groups can be unsaturated moieties that can undergo a cycloaddition reaction, e.g., an alkene, alkyne, diene, nitrile, azide, carbonyl, imine, or hydroxamic acid.

The multifunctional crosslinker has reactive groups that are available for bond formation; that is the multifunctional crosslinker can be crosslinked when the reactive groups of the branched or telechelic prepolymer. Examples of reactive groups on a suitable multifunctional crosslinker include nucleophilic groups or electrophilic groups. The reactive groups of the multifunctional crosslinker can be complementary to the reactive groups of the branched or telechelic prepolymer. For example, if the reactive groups of the branched or telechelic prepolymer comprise electrophilic reactive groups the multifunctional crosslinker can comprise nucleophilic reactive groups.

In some examples, the multifunctional crosslinker can comprise 2 or more reactive groups e.g., 3 or more, 4 or more, or 5 or more), in some examples the multifunctional crosslinker can comprise 6 or less reactive groups (e.g., 5 or less, 4 or less, or 3 or less) number of reactive groups of the multifunctional crosslinker can range from any of the minimum values described above to any of the maximum values described above, for example from 2 to 6 (e.g., from 2 to 4, from 4 to 6, from 3 to 5, from 2 to 3, from 3 to 4, from 4 to 5, or from 5 to 6). In some examples, the multifunctional crosslinker can comprise a Michael donor. In some examples, the multifunctional crosslinker can comprise a multifunctional thiol.

Crosslinking the branched or telechelic prepolymer can occur by any suitable crosslinking reaction, with the provision that substantially none of the crosslinks are the reaction product of a free radical. The amount of crosslinking, and thus the amount of reactive groups in the prepolymer involved in reactions, can be controlled by selecting the desired amount of multifunctional crosslinker. That is, the stoichiometry of the reagents can be used to dictate the extent of crosslinking. The amount of crosslinking can be monitored by various analytical techniques, such as TLC, IR spectroscopy, and NMR.

Examples of crosslinking reactions include, but are not limited to, photocurring cationic polymerization, anionic polymerization, coordination polymerization, ring-opening polymerization, chain-growth polymerization, chain transfer polymerization, emulsion polymerization, ionic polymerization, solution polymerization, step-growth polymerization, suspension polymerization, radical polymerization, condensation reactions, cycloaddition reactions, electrophilic additions, and nucleophilic additions (e.g., Michael additions). In some examples, crosslinking the branched or telechelic prepolymer can comprise a Michael addition. In some examples, the branched or telechelic prepolymer can comprise (meth)acrylate groups and crosslinking the branched or telechelic prepolymer can comprise base-catalyzed Michael addition of the (meth)acrylate groups of the branched or telechelic prepolymer and nucleophilic reactive groups (e.g., thiol, alcohol, or amine) of the multifunctional crosslinker. In some examples, the nucleophile is a multivalent nucleophile, which contains more than one nucleophile. A specific example, includes a multivalent thiol.

In some examples, the crosslinking reaction can be performed in the presence of a radical scavenger. Examples of suitable radical scavengers include 2,2',6,6'-tetramethyl-1-piperinyloxy, free radical (TEMPO); 4-amino-2,2',6,6'-tetramethyl-1-piperinyloxy, free radical (4-amino-TEMPO); 4-hydroxy-2,2',6,6'-tetramethyl-piperidene-1-oxy, free radical (TEMPOL), 2,2',3,4,5,5'-hexamethyl-3-imidazolinium-1-yloxy methyl sulfate, free radical; 16-doxyl-stearic acid, free radical; superoxide dismutase mimic (SODm), ascorbic acid, glutathione, tocopherols, and tocotrienols. Further examples of suitable radical scavengers include alkanolamines, amino sugars, amino acids and mixtures thereof, and can include, but are not limited to: monoethanolamine, 3-amino-1-propanol, 4-amino-1-butanol, 5-amino-1-pentanol, 1-amino-2-propanol, 1-amino-2-butanol, 1-amino-2-pentanol, 1-amino-3-pentanol, 1-amino-4-pentanol, 3-amino-2-methylpropan-1-ol, 1-amino-2-methylpropan-2-ol, 3-aminopropane-1,2-diol, glucosamine, N-acetylglucosamine, glycine, arginine, lysine, proline, glutamine, histidine, serine, tryptophan and potassium, sodium and ammonium salts of the above and mixtures thereof. Other suitable radical scavenger compounds include benzylamine, glutamic acid, imidazole, di-tert-butylhydroxytoluene, hydroquinone, catechol and mixtures thereof. In certain examples, the radical scavenger is hydroquinone HQ. In still other specific examples, the radical scavenger phenothiazine, which in many ways is beneficial in that it is basic and does not complex with other bases used to catalyze the Michael addition. Residues and byproducts of these scavengers can also be present in the disclosed shape-memory polymers.

After the crosslinking, the resulting shape-memory polymer can be purified and/or isolated.

In some examples, the shape-memory polymers described herein can store elastic energy. In some examples, the shape-memory polymer can have an elastic energy density of 0.5 megajoules per cubic meter ($MJ/m^3$) or more (e.g., 0.6 $MJ/m^3$ or more, 0.7 $MJ/m^3$ or more, 0.8 $MJ/m^3$ or more, 0.9 $MJ/m^3$ or more, 1.0 $MJ/m^3$ or more, 1.1 $MJ/m^3$ or more, 1.2 $MJ/m^3$ or more, 1.3 $MJ/m^3$ or more, 1.4 $MJ/m^3$ or more, 1.5 $MJ/m^3$ or more, 1.6 $MJ/m^3$ or more, 1.7 $MJ/m^3$ or more, 1.8 $MJ/m^3$ or more, 1.9 $MJ/m^3$ or more, 2.0 $MJ/m^3$ or more, 2.1 $MJ/m^3$ or more, 2.2 $MJ/m^3$ or more, 2.3 $MJ/m^3$ or more, 2.4 $MJ/m^3$ or more, 2.5 $MJ/m^3$ or more, 2.6 $MJ/m^3$ or more, 2.7 $MJ/m^3$ or more, 2.8 $MJ/m^3$ or more, or 2.9 $MJ/m^3$ or more). In some examples, the shape-memory polymers can have an elastic energy density of 3 $MJ/m^3$ or less (e.g., 2.9 $MJ/m^3$ or less, 2.8 $MJ/m^3$ or less, 2.7 $MJ/m^3$ or less, 2.6 $MJ/m^3$ or less, 2.5 $MJ/m^3$ or less, 2.4 $MJ/m^3$ or less, 2.3 $MJ/m^3$ or less, 2.2 $MJ/m^3$ or less, 2.1 $MJ/m^3$ or less, 2.0 $MJ/m^3$ or less, 1.9 $MJ/m^3$ or less, 1.8 $MJ/m^3$ or less, 1.7 $MJ/m^3$ or less, 1.6 $MJ/m^3$ or less, 1.5 $MJ/m^3$ or less, 1.4 $MJ/m^3$ or less, 1.3 $MJ/m^3$ or less, 1.2 $MJ/m^3$ or less, 1.1 $MJ/m^3$ or less, 1.0 $MJ/m^3$ or less, 0.9 $MJ/m^3$ or less, 0.8 $MJ/m^3$ or less, 0.7 $MJ/m^3$ or less, or 0.6 $MJ/m^3$ or less). The elastic energy density of the shape-memory polymer can range from any of the minim values described above to any of the maximum values described above, for example from 0.5 $MJ/m^3$ to 3 $MJ/m^3$ (e.g., from 0.5 $MJ/m^3$ to 2 $MJ/m^3$, from 2 $MJ/m^3$ 3 $MJ/m^3$, from 1 $MJ/m^3$ to 2.5 $MJ/m^3$, from 1 $MJ/m^3$ to 1.5 $MJ/m^3$, from 1.5 $MJ/m^3$ to 2 $MJ/m^3$, from 1 $MJ/m^3$ to 1.2 $MJ/m^3$, from 1.2 $MJ/m^3$ to 1.5 $MJ/m^3$, from 1.5 $MJ/m^3$ to 1.7 $MJ/m^3$, from 1.7 $MJ/m^3$ to 2 $MJ/m^3$, from 1.2 $MJ/m^3$ to 1.8 $MJ/m^3$, or from 1.3 $MJ/m^3$ to 1.7 $MJ/m^3$).

In some examples, the shape-memory polymer can have an energy storage efficiency (e.g., ratio of energy output to energy input) of 2% or more (e.g., 3% or more, 4% or more, 5% or more, 6% or more, 7% or more, 8% or more, 9% or more, 10% or more, 11% or more, 12% or more, 13% or more, 14% or more, 1.5% or more, 16% or more, 17% or more, 18% or more, or 19% or more). In some examples, the shape-memory polymer can have an energy storage efficiency of 20% or less 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, or 3% or less). The energy storage efficiency of the shape-memory polymer can range from any of the minimum values described above to any of the maximum values described above, for example from 2% to 20% (e.g., from 2% to 11%, from 11% to 20%, from 2% to 5%, from 5% to 10%, from 10% to 15%, or from 15% to 20%).

In some examples, the shape-memory polymer can have Young's modulus at room temperature of 180 megapascals (MPa) or more (e.g., 190 MPa or more, 200 MPa or more, 210 MPa or more, 220 MPa or more, 230 MPa or more, 240 MPa or more, 250 MPa or more, 260 MPa or more, 270 MPa or more, 280 MPa or more, 290 MPa or more, 300 MPa or more, 310 MPa or more, 320 MPa or more, 330 MPa, or more, 340 MPa, or more, 350 MPa, or more, 360 MPa, or more, 370 MPa, or more, 380 MPa or more, 390 MPa or more, or 400 MPa or more). In some examples, the shape-memory polymer can have Young's modulus at room temperature of 400 MPa or less, (e.g., 390 MPa or less, 380 MPa, or less, 370 MPa or less, 360 MPa or less, 350 MPa or less, 340 MPa or less, 330 MPa or less, 320 MPa or less, 310 MPa or less, 300 MPa or less, 290 MPa or less, 280 MPa or less, 270 MPa, or less, 260 MPa or less, 250 MPa or less, 240 MPa or less, 230 MPa or less, 220 MPa or less, 210 MPa, or less, 200 MPa or less, or 190 MPa, or less). The Young's modulus at room temperature of the shape-memory polymer can range from any of the minimum values described above to any of the maximum values described above, for example from 180 MPa to 400 MPa (e.g., from 180 MPa to 290 MPa, from 290 MPa, to 400 MPa, from 220 MPa to 360 MPa, from 180 MPa to 203 MPa, from 230 MPa to 290 MPa, from 290 MPa to 350 MPa, or from 350 MPa to 400 MPa).

In some examples, the shape-memory polymer can have a Young's modulus at 70° C. of 0.3 MPa or more 0.5 MPa or more, 0.75 MPa, or more, 1.0 MPa or more, 1.25 MPa, or more, 1.5 MPa or more, 1.75 MPa or more, 2 MPa or more, 2.25 MPa or more, 2.5 MPa or more, 2.75 MPa or more, 3 MPa or more, 3.25 MPa or more, 3.5 MPa or more, 3.75 MPa or more, 4 MPa, or more, 4.25 MPa or more, 4.5 MPa, or more, or 4.75 MPa or more). In some examples, the shape-memory polymer can have a Young's modulus at 70° C. of 5 MPa or less (e.g., 4.75 MPa or less, 4.5 MPa or less, 4.25 MPa or less, 4 MPa or less, 3.75 MPa or less, 3.5 MPa or less, 3.25 MPa or less, 3 MPa or less, 2.75 MPa or less, 2.5 MPa or less, 2.25 MPa or less, 2 MPa or less, 1.75 MPa, or less, 1.5 MPa, or less, 1.25 MPa or less, 1.0 MPa or less, 0.75 MPa or less, or 0.5 MPa or less). The Young's modulus at 70° C. can range from any of the minimum values described above to any of the maximum values described above, for example from 0.3 MPa to 5 MPa (e.g., from 0.3 MPa to 3 MPa, from 3 MPa to 5 MPa, from 0.3 MPa to 1 MPa, from 1 MPa, to 2 MPa, from 2 MPa to 3 MPa, from 3 MPa to 4 MPa, from 4 MPa to 5 MPa, or from 1 MPa to 4 MPa).

In some examples, the shape-memory polymer can have a strength of 5 MPa or more (e.g., 6 MPa or more, 7 MPa or more, 8 MPa or more, 9 MPa or more, 10 MPa or more, 11 MPa or more, 12 MPa or more, 13 MPa or more, 14 MPa or more, 15 MPa or more, 16 MPa or more, 17 MPa or more, 18 MPa or more, or 19 MPa or more). In some examples, the shape-memory polymer can have a strength of 20 MPa or less (e.g., 19 MPa or less, 18 MPa or less, 17 MPa or less, 16 MPa or less, 15 MPa or less, 14 MPa or less, 13 MPa or less, 12 MPa or less, 11 MPa or less, 10 MPa or less, 9 MPa or less, 8 MPa or less, 7 MPa or less, or 6 MPa or less). The strength of the shape-memory polymer can range from any of the minimum values described above to any of the maximum values described above, for example from 5 MPa to 20 MPa (e.g., from 5 MPa to 12 MPa, from 12 MPa to 20 MPa, from 5 MPa to 10 MPa, from 10 MPa to 15 MPa, or from 15 MPa to 20 MPa).

The shape-memory polymer can have, for example, a degree of crystallinity of 0.4 or more (e.g., 0.41 or more, 0.42 or more, 0.43 or more, 0.44 or more, 0.45 or more, 0.46 or more, 0.47 or more, 0.48 or more, 0.49 or more, 0.50 or more, 0.51 or more, 0.52 or more, 0.53 or more, 0.54 or more, 0.55 or more, 0.56 or more, 0.57 or more, 0.58 or more, or 0.59 or more). In some examples, the shape-memory polymer can have a degree of crystallinity of 0.6 or less (e.g., 0.59 or less, 0.58 or less, 0.57 or less, 0.56 or less, 0.55 or less, 0.54 or less, 0.53 or less, 0.52 or less, 0.51 or less, 0.50 or less, 0.49 or less, 0.48 or less, 0.47 or less, 0.46 or less, 0.45 or less, 0.44 or less, 0.43 or less, 0.42 or less, or 0.41 or less). The degree of crystallinity of the shape-memory polymer can range from any of the minimum values described above to any of the maximum values described above, for example from 0.4 to 0.6 (e.g., from 0.4 to 0.5, from 0.5 to 0.6, from 0.4 to 0.45, from 0.45 to 0.5, from 0.5 to 0.55, from 0.55 to 0.6, or from 0.45 to 0.55).

In some examples, the shape-memory polymer can have a strain fixity of 65% or more (e.g., 70% or more, 75% or more, 80% or more, 85% or more, 90% or more, or 95% or more). In some examples, the shape-memory polymer can have a strain fixity of 100% or less (e.g., 95% or less, 90% or less, 85% or less, 80% or less, 75% or less, or 70% or less). The strain fixity of the shape-memory polymer can range from any of the minimum values described above to any of the maximum values described above, for example from 65% to 100% (e.g., from 65% to 80%, from 80% to 100%, from 65% to 75%, from 75% to 85%, or from 85% to 100%).

In some examples, the shape-memory polymer can have a stress free or unconstrained shape recovery ratio of 0.9 or more (e.g., 0.91 or more, 0.92 or more, 0.93 or more, 0.94 or more, 0.95 or more, 0.96 or more, 0.97 or more, 0.98 or more, or 0.99 or more). In some examples, the shape-memory polymer can have a stress free or unconstrained shape recovery ratio of 1.0 or less (e.g., 0.99 or less, 0.98 or less, 0.97 or less, 0.96 or less, 0.95 or less, 0.94 or less, 0.93 or less, 0.92 or less, or 0.91 or less). The stress free or unconstrained shape recovery ratio of the shape-memory polymer can range from any of the minimum values described above to any of the maximum values described above, for example from 0.9 to 1.0 (e.g., from 0.9 to 0.95, from 0.95 to 1.0, from 0.9 to 0.93, from 0.93 to 0.96, or from 0.96 to 1.0).

Also disclosed herein are methods of making shape-memory polymers. The disclosed methods can comprise, for example, crosslinking stoichiometric amount of a multifunctional crosslinker with a branched or telechelic prepolymer having a low polydispersity in the substantial absence of free radicals.

In some examples, the method can further comprise stretching the shape-memory polymer. Stretching the shape-memory polymer can be accomplished by standard techniques. In some examples, stretching the shape-memory polymer can comprise applying a stretching load.

When stretching the shape-memory polymer, the rate at which the polymer is stretched can influence the crystallinity. Stretching reforms a fraction of crystals into more stable configurations, which melt at higher temperatures. In general, the slower the stretching, the more crystals form and the higher the melting point. Faster stretching generally results in less crystals and lower melting. Thus, by varying the stretch rate, one can control the crystallinity and melting point of the polymer. Stretch rates that can be used full herein can be from 10% strain per min (e.g., 0.1 strain units per minute) to 5000% strain per min. For example, the stretch rate can be 10, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, 3000, 3050, 3100, 3150, 3200, 3250, 3300, 3350, 3400, 3450, 3500, 3550, 3600, 3650, 3700, 3750, 3800, 3850, 3900, 3950, 4000, 4050, 4100, 4150, 4200, 4250, 4300, 4350, 4400, 4450, 4500, 4550, 4600, 4650, 4700, 4750, 4800, 4850, 4900, 4950, or 5000% strain per minute, where any of the stated values can form an upper or lower endpoint of a range. In still other examples, the stretch rate can be greater than 10% strain per min, e.g., greater than 50% strain per min, greater than 100% strain per min, greater than 1000% strain per min, greater than 2000% strain per min, greater than 3000% strain per min, greater than 4000% strain per min, or greater than 5000% strain per min.

Another parameter that can affect the crystallinity of the shape-memory polymers is the period of time the polymer is held in its stretched state (i.e., the hold time). Generally holding samples in their stretched state for longer periods of time can lead to more stable crystals. Hold times that can be useful herein include from 0 min to 15 min. For examples, the hold time can be 0, 1, 3, 4, 5, 6, 7, 8, 9, 10, 11, 12, 13, 14, or 15, where any of the stated values can form an upper or lower endpoint of a range. Longer hold times are also possible, for example, 1 min or more, 5 min or more, 10 min or more, or 20 min or more. In certain specific examples, the shape-memory polymer is held from 30 to 120 seconds, for example from 60 to 90 seconds, or for 70 seconds. In some examples, the shape memory polymer is held at a temperature below the melting transition temperature during the hold time.

The shape-memory polymer can have an unstretched length and a post-stretched length. The post-stretched length can be greater than the unstretched length. The shape-memory polymer can be stretched to any point up to the breaking point, meaning the post-stretched length can be longer than the unstretched length by any amount, up to the length where the shape-memory polymer breaks.

In some examples, the post-stretched length can be longer than the unstretched length, for example, by 200% or more (e.g., 300%, or more, 400% or more, 500% or more, 600% or more, 700% or more, or 800% or more). In some examples, the post-stretched length can be longer than the unstretched length by 800% or less (e.g., 700% or less, 600% or less, 500% or less, 400% or less, or 300% or less). The amount that the post-stretched length is longer than the unstretched length can range from any of the minimum values described above to any of the maximum values described above, for example from 200% to 800% (e.g., from 300% to 600%, from 600% to 800%, from 200% to 500%, from 500% to 700%, from 700% to 800%, or from 200% to 600%).

In some examples, the method can further comprise heating the shape-memory polymer while the shape-memory polymer is maintained at the post-stretched length. In some examples, the method can further comprise removing the stretching load from the shape-memory polymer.

Also disclosed herein are methods of measuring the energy storage capacity of a shape-memory polymer. The disclosed methods can comprise stretching a shape-memory polymer from an unstretched length to a post-stretched length, wherein stretching comprising applying a load; maintaining the shape-memory polymer at the post-stretched length for a first time; heating the shape-memory polymer at the post-stretched length for a second time; removing the load from the shape-memory polymer at the post-stretched length at an unloading rate; collecting a plurality of force measurements of the shape-memory polymer as the load is removed; collecting a plurality of length measurements of the shape-memory polymer corresponding to each of the force measurements; generating a force over length curve based on the force measurements and length measurements of the shape-memory polymer as the load is removed; and analyzing the force over length curve to determine the energy storage capacity of the shape-memory polymer.

One or more of the collecting, generating, and analyzing steps can be carried out in whole or in part on one or more processing devices. FIG. 1 illustrates a suitable processing device upon which the methods disclosed herein may be implemented. The processing device 160 can include a bus or other communication mechanism for communicating information among various components of the processing device 160. In its most basic configuration, a processing device 160 typically includes at least one processing unit 212 (a processor) and system memory 214. Depending on the exact configuration and type of processing device, the system memory 214 may be volatile (such as random access memory (RAM)), non-volatile (such as read-only memory (ROM), flash memory, etc.), or some combination of the two. This most basic configuration is illustrated in FIG. 1 by a dashed line 210. The processing unit 212 may be a standard programmable processor that performs arithmetic and logic operations necessary for operation of the processing device 160.

The processing device 160 can have additional features/functionality. For example, the processing device 160 may include additional storage such as removable storage 216 and non-removable storage 218 including, but not limited to, magnetic or optical disks or tapes. The processing device 160 can also contain network connection(s) 224 that allow the device to communicate with other devices. The processing device 160 can also have input device(s) 222 such as a keyboard, mouse, touch screen, antenna or other systems configured to communicate with the camera in the system described above, etc. Output device(s) 220 such as a display, speakers, printer, etc. may also be included. The additional devices can be connected to the bus in order to facilitate communication of data among the components of the processing device 160.

The processing unit 212 can be configured to execute program code encoded in tangible, computer-readable media. Computer-readable media refers to any media that is capable of providing data that causes the processing device 160 (i.e., a machine) to operate in a particular fashion. Various computer-readable media can be utilized to provide instructions to the processing unit 212 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

For example, the processing unit 212 can execute program code stored in the system memory 214. For example, the bus can carry data to the system memory 214, from which the processing unit 212 receives and executes instructions. The data received by the system memory 214 can optionally be stored on the removable storage 216 or the non-removable storage 218 before or after execution by the processing unit 212.

The processing device 160 typically includes a variety of computer-readable media. Computer-readable media can be any available media that can be accessed by device 160 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 214, removable storage 216, and non-removable storage 218 are all examples of computer storage media. Computer storage media include, but are not limited to, RAM, ROM, electrically erasable program read-only memory (EE-PROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by processing device 160. Any such computer storage media can be part of processing device 160.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a processing device, the machine becomes an apparatus for practicing the presently disclosed subject matter. In the case of program code execution on programmable computers, the processing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface, reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

The examples below are intended to further illustrate certain aspects of the methods and compounds described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

ε-caprolactone (CL) monomer, triethyl amine and glycerol were purchased from Sigma-Aldrich, and were distilled before use. All the other chemicals were obtained from Sigma-Aldrich, and were used as received. NMR spectra were acquired on a Brüker AVANCE-III 400 NMR Spectrometer system operating at 400.13 MHz for $^1$H observation. Attenuated total-reflection Fourier transform infrared (FTIR) spectroscopy (Shimadzu 8000S) was used to assess the presence of acrylate end-groups near the sample surface. Molecular weight and polydispersity were measured by size exclusion chromatography (PolyAnalytik PAS103-L and PAS104-L GPC columns and Viscotek TPA301 detector) using THF as an eluent and polystyrene standards. Matrix-assisted laser deionization/ionization mass spectroscopy (Broker Autoflex III MALDI-TOF) was applied to determine the molar mass distribution.

Efforts have been made to ensure accuracy with respect to numbers e.g., amounts, temperature, etc) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Polymers that undergo strain-induced crystallization can simplify the shape programming step of a shape-memory cycle. Kraft and coworkers have demonstrated cold-drawable aramid-containing polyamides with crystallizable polys-caprolactone) (PCL) soft segments that can be strain-crystallized at room temperature (Rabani Ci et al. *Polymer* 2005, 46(1), 27-35; Rabani G et al. *Polymer* 2006, 47(12), 4251-4260; Rabani Ci et al. *J Polym Sci Pol Chem* 2004, 42(6), 1449-1460; Schuh C et al. Polymers-Basel 2010, 2(2), 71-85). Upon load removal, following strain, the material remains deformed as if plastic deformation has occurred—however, upon heating above its soft segment melting temperature, the material reverts to its original shape. Similar observations have been reported for other materials, including polyurethanes and natural rubber (Gu X Z and Mather P T. *Polymer* 2012, 53(25), 5924-5934; Ping P et al. *Biomacromolecules* 2005, 6(2), 587-592; Rodriguez E D et al. *Acs Appl Mater Inter* 2011, 3(2), 152-161; Wang W et al. *Macromolecules* 2010, 43(6), 2942-2947; Heuwers B et al. *Macromol Chem Phys* 2013, 214(8), 912-923; Heuwers B et al. *Macromol Rapid Comm* 2012, 33(18), 1517-1522). Morphological and crystal texture changes that occur during cold-drawing have been studied fir PCL-based polyurethanes. The amorphous PCL phase is initially oriented, followed by reorientation of hard segment and crystalline PCL, and stress-induced disaggregation and recrystallization (in direction of stress) of crystalline PCL (Wang W et al. *Macromolecules* 2010, 43(6), 2942-2947).

The effect of molecular architecture on the cold-drawability and shape-memory properties of PCL-based covalent networks was investigated. The synthesis of shape-memory networks capable of storing elastic energy by base-catalyzed Michael addition of multifunctional thiols with low polydispersity, acrylate-terminated poly(ε-caprolactone) chains was also investigated. Three-arm PCLs containing acrylate end-groups were synthesized and crosslinked, fixing the molecular weights between crosslinks. Network formation was accomplished with the selective and efficient thiol-acrylate Michael Addition reaction.

The thiol-acrylate or allyl reaction can be controlled such that the molecular weight between crosslinks can be substantially the same as that of polymer precursor branches. Further, the chemistry is compatible with polymer melt processing, including injection molding, and the material can be formed into different shapes. The resulting elastomers exhibited a degree of crystallinity and shape-memory properties. Elastomers were cold-drawn to achieve several hundred percent of temporary strain, and, upon heating, shape recovery was observed. Shape fixity (strain fixity) upon cold-drawing was correlated to the degree of strain-induced crystallization which can be influenced by the draw-rate and stress treatment following cold-drawing. Slow-unloading of samples drawn to 400% elongation showed the material is capable of storing greater than 1.5 $MJ/m^3$ of elastic energy.

The hydroxy-terminated, three-arm poly(caprolactone) was synthesized by ring-opening polymerization of caprolactone (CL) in the presence of $SnOct_2$ as catalyst and glycerol as tri-functional initiator (Kricheldorf H R and Hachmann-Thiessen H. *Macromol Chem Phys* 2005, 206(7), 758-766). To a 100 mL flask, distilled CL (50.0 g, 50 eq), glycerol (807 mg, 1 eq) and $SnOct_2$ (88.8 mg, 1/40 eq) were added. The reaction was carried out in bulk at 120° C. under continuous $N_2$, purge for 24 hours. The resultant polymer (PCL-triol) was purified through precipitation into methanol and vacuum dried at 60° C. overnight (Yield 98.6%). Molecular weight of the obtained prepolymer was determined to be 6.100 g/mol (NMR end-group analysis) and polydispersity index (PDI) was 1.18 (GPC).

The hydroxy-terminated prepolymer was acrylated by nucleophilic substitution with acryloyl chloride to form a three-arm prepolymer. To PCL-triol (30.0 g, 1 eq.), under $N_2$ at 0° C., freshly distilled toluene and triethylamine (2.273, 1.5 eq.) were added. After 30 minutes of degassing with $N_2$, acryloyl chloride (1.82 mL, 2.035 g, 1.5 eq.) was added dropwise over two hours. The reaction was warmed to 80° C. and allowed to stir for 48 hours. The mixture was filtered and the liquid fraction was precipitated into methanol to afford a white powder. The PCL-triacrylate product (PCL-prepolymer) was vacuum-dried at 60° C. overnight (Yield 96.0%), NMR suggested a molecular weight of 6,200 g/mol and complete end-group conversion while GPC showed a polydispersity of 1.20.

MALDI-TOF spectrometry was performed to assess the synthesis of the hydroxyl-terminated poly(caprolactone) (PCL-Triol) and the acrylated prepolymer. Matrix-assisted laser deionization/ionization mass spectroscopy (Brüker Autoflex III MALDI-TOF) was applied to determine the molar mass distribution. The MALDL-TOF spectra of both PCL-Triol and PCL-prepolymer are displayed in FIG. 2. Within each material, the distances between adjacent peaks is M/Z=114, which is consistent with the monomer molecular weight. The spectrum shifted following acrylation by distances of M/Z=162, indicating complete transformation from hydroxyl to acrylate groups (i.e. $C_3H_2O \times 3$).

Figure 3:
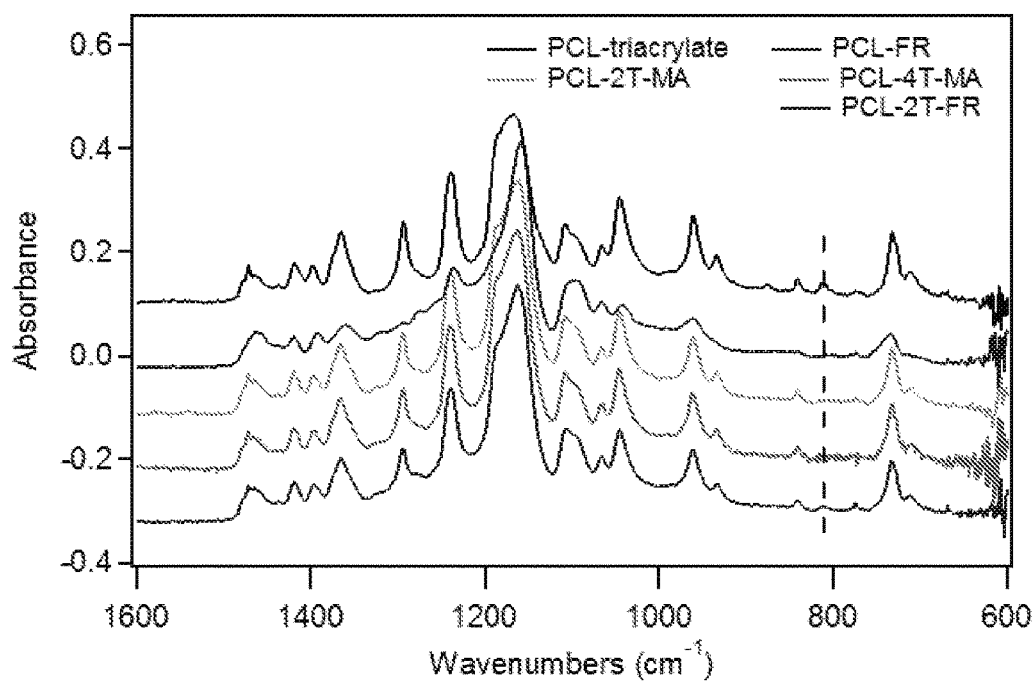
FIG. 3 displays the FTIR spectra of the PCL prepolymer and synthesized networks. The dashed line denotes the peak position of the C=C—H bend.

At 60° C., PCL-triacrylate (1.0 g, 1 eq.) was mixed with thermal initiator benzoyl peroxide (BPO) (10 mg, 1 wt. %). The mixture was immediately sandwiched between two glass slides separated by a 200 μm thick Teflon spacer. The sample (PCL-FR) was allowed to cure for 48 hours and IR spectroscopy (8000S, Shimadzu) was employed to assess the degree of end-group conversion (FIG. 3).

At 60° C., a stoichiometrically balanced mixture was formulated with PCL-triacrylate (1.0 g, 1 eq.), 2,2'-(Ethylenedioxy)diethanethiol, a dithiol (43.5 mg, 1.5 eq.) and a catalytic amount of 4-dimethylamino pyridine (DMAP) (10 mg, 1 wt. %). The mixture was immediately sandwiched between two glass slides separated by a 200 μm thick Teflon spacer. The sample (PCL-2T-MA) was allowed to cure for 48 hours and IR spectroscopy (8000S, Shimadzu) was employed to assess the degree of end-group conversion (FIG. 3).

At 60° C., a stoichiometrically balanced mixture was formulated with PCL-triacrylate (1.0 g, 1 eq.), pentaerythritol tetrakis(3-mercaptopropionate) (PETMP), a tetrathiol (58.3 mg 1.5 eq.) and a catalytic amount of DMAP (10 mg, 1 wt. %). The mixture was immediately sandwiched between two glass slides separated by a 200 μm thick Teflon spacer. The sample (PCI-4T-MA) was allowed to cure for 48 hours and IR spectroscopy (8000S, Shimadzu) was employed to assess the degree of end-group conversion (FIG. 3).

At 60° C., a stoichiometrically balanced mixture was formulated with PCL-triacrylate (1.0 g, 1 eq.), dithiol (43.5 mg, 1.5 eq.) and BPO (10 mg, 1 wt. %). The mixture was immediately sandwiched between two glass slides separated by a 200 μm thick Teflon spacer. The sample (PCL-2T-FR.) was allowed to cure for 48 hours and IR spectroscopy (8000S, Shimadzu) was employed to assess the degree of end-group conversion (FIG. 3).

FIG. 3 shows part of the FT-IR spectra of the acrylate-terminated prepolymer and the different cured networks. The absorption peak at 810 $cm^{-1}$ is characteristic of the C=C—H bend of the prepolymer's acrylate group. The nearly complete disappearance of this peak after Michael addition indicates that almost all acrylate groups were consumed during formation of PCL-FR, PCL-2T-MA and PCL-4T-MA. This suggests that the mixed precursors have merged into one crosslinked network. The residual peak in PCL-2T-FR's spectrum indicates incomplete consumption of acrylate end-groups, which is consistent with the material's low gel fraction.

Gel fraction tests were performed on all cured samples to determine the mass % of extractable species, the results of which are summarized in Table 1. The four films were vacuum dried at 80° C. overnight and weighed. Films were then swollen in THF for 100 hours to extract any free molecular species that are not covalently connected to the network (i.e. free prepolymers, thiol reagents and base catalyst). The resulting films were vacuum dried for another 4 hours and their weights were again recorded.

TABLE 1

Summary of gel fraction experiments on synthesized PCL networks.

| Sample | Weight before swelling (mg) | Deswollen sample weight (mg) | Gel fraction |
|---|---|---|---|
| PCL-FR | 213.76 | 212.80 | 99.5% |
| PCL-2T-MA | 158.76 | 157.19 | 99.0% |
| PCL-4T-MA | 193.31 | 191.20 | 98.9% |
| PCL-2T-FR | 200.72 | 179.54 | 89.4% |

Differential scanning calorimetry was performed using a TA Instruments, Q2000 DSC. Five to six mg samples were placed in a hermetically sealed pan and subjected to heating and cooling at 5° C./min over the temperature range of −50° C. to 100° C.

Figure 4:
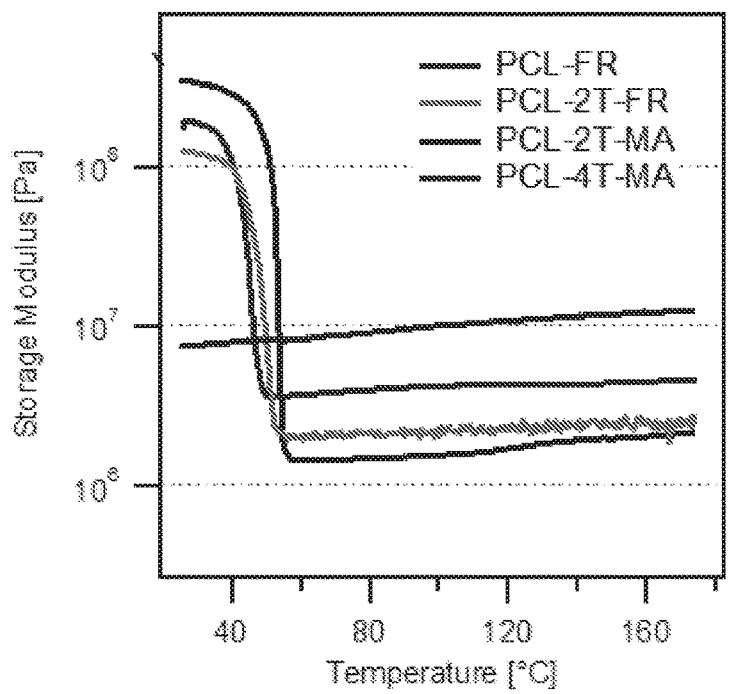
FIG. 4 displays the storage modulus of PCL networks from dynamic mechanical analysis versus temperature.

Dynamic Mechanical Analysis (DMA) temperature ramp experiments were performed in tension at 1 Hz and 5° C./min over the temperature range 25-180° C. using a Rheometrics RSAII solids analyzer. Data were analyzed using the commercially available TA Orchestrator software program. FIG. 4 shows that all networks formed by thiol-acrylate Michael Addition become much softer near the PCL melting temperature. This transition is not observed in the network formed by conventional radical polymerization (PCL-FR) because its melting transition is beneath the experimental range.

Figure 6:
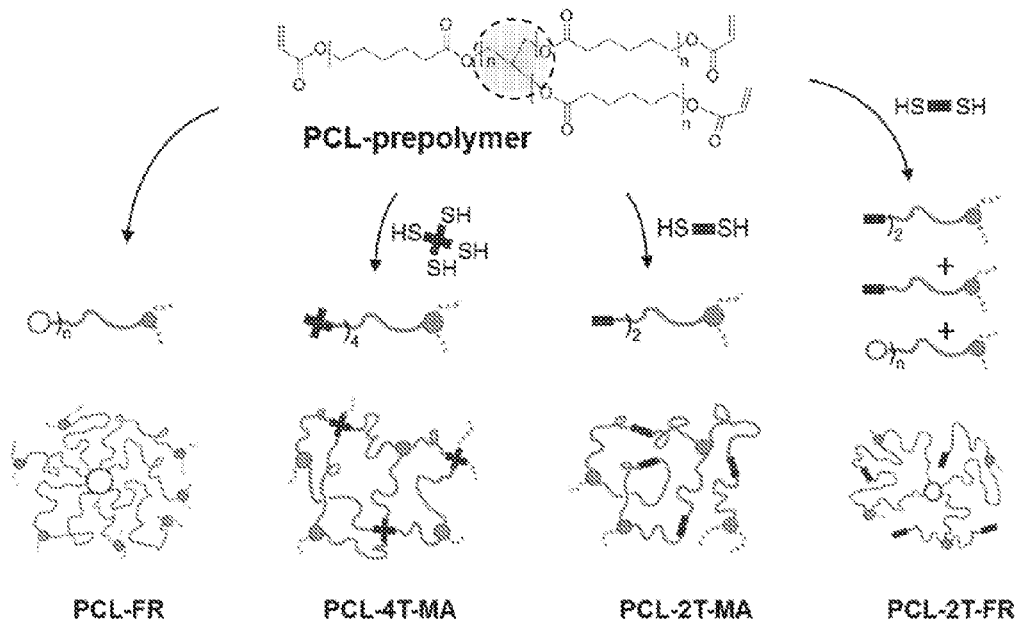
FIG. 6 displays a schematic of the synthesis of semicrystalline network elastomers with different network structures from a three-arm poly(caprolactone) prepolymer. Prepolymer acrylate end-groups are crosslinked by free radical polymerization, thiol-acrylate coupling, or both. Cartoons depict the expected network structures: grey circles denote trifunctional crosslinks originating from the prepolymer; white circles are multifunctional crosslinks from radical polymerization of acrylate end-groups; and black symbols are bifunctional and tetrafunctional crosslinks from thiol-acrylate coupling with multifunctional thiol reagents.

Two-dimensional wide angle X-ray scattering (WAXS) were performed on a Brüker General Area Detector Diffraction System (GADDS), with a highly collimated 1 mm diameter beam and Brüker HI-STAR area detector.

molecular weight is low enough to ensure that chain entanglements do not interfere with interpretation of results by acting as temporary crosslinks. The same batch of PCL prepolymer was used to prepare four networks with different topologies, according to FIG. 6, and results from dynamic mechanical analysis and tensile stress-to-break experiments are summarized in Table 2.

TABLE 2

Characteristics of synthesized poly(caprolactone) networks.

| sample | Gel fraction | $E'_{RT}{}^{a}$ [MPa] | $E'_{HT}{}^{b}$ [MPa] | Elongation-at-break$^c$ (%) | Ultimate Strength$^c$ [MPa] | $M_c^{eff\,d}$ [g/mol] |
|---|---|---|---|---|---|---|
| PCL-FR | 99.5% | 7.5* | 8.70 | 130% | 2.2 | 1,100 |
| PCL-2T-MA | 99.0% | 334 | 1.45 | 1,410 ± 40% | 22.7 ± 0.9 | 6,700 |
| PCL-4T-MA | 98.9% | 187 | 3.84 | 119 ± 6% | 8.4 ± 0.62 | 2,500 |
| PCL-2T-FR | 89.4% | 121 | 2.06 | 670 ± 250% | 13.8 ± 3.3 | 4,700 |

$^a$ Room temperature Young's modulus taken at 25° C., DMA
$^b$ High temperature Young's modulus taken at 70° C., DMA
$^c$Obtained from a strain-to-break experiment performed under tension at 60 mm/min
$^d$ Effective molecular weight between crosslinks; $M_c^{eff} = 3\rho RT/E'_{HT}$ where $\rho$ is density and was taken as 1.14 g/cm$^3$ and temperature was 70° C.
*This value is significantly lower because it was obtained above the sample's melting temperature All stress-strain, shape-memory, and cold-drawing experiments were performed using an MTS tensile testing apparatus (Q Test/5) equipped with a custom-made heating chamber. All measurements were made on film samples (0.2 mm thickness) that were cut using a trim die according to ASTM D638-Type 5 (gauge length=7.62 mm). Following cold-drawing, most of the sample strain was confined within the gauge length. For some samples, a small amount of strain (<5% of total strain) was observed outside of the gauge length and was neglected. Following each shape-memory cycle, the cross-head was returned to the original zero-strain setting, and the temperature was reduced to room temperature to allow the sample to crystallize at room temperature for ten minutes before starting the subsequent cycle. For cold-drawing experiments, samples were trained by performing three stress-free shape memory cycles prior to cold-drawing.

Figure 5:
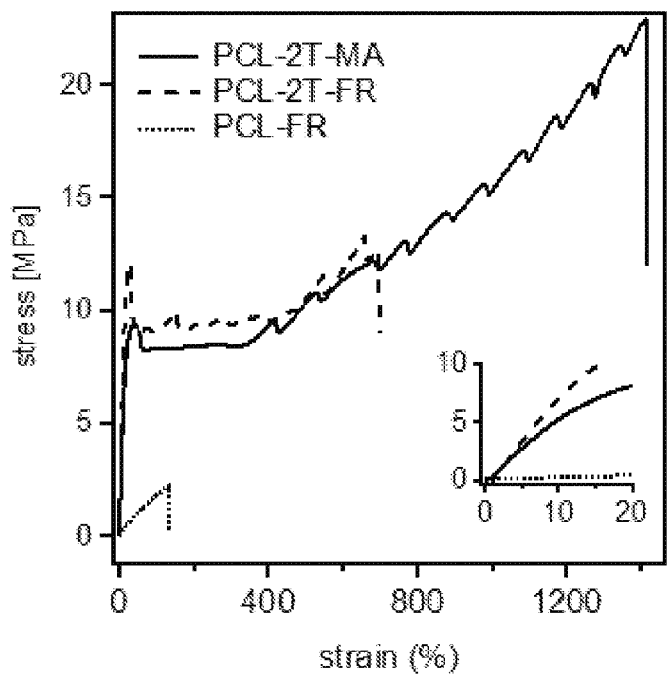
FIG. 5 displays representative stress-strain curves of PCL networks formed by free radical polymetization (PCL-FR), photo-induced free radical thiol-acrylate reaction (PCL-2T-FR), and base catalyzed thiol-acrylate Michael Addition (PCL-2T-MA).

Tensile test experiments were performed using an MTS tensile testing apparatus (Q Test/5) at room temperature. Measurements were made on film samples (0.2 mm thickness) that were cut using a trim die according to ASTM D638-Type 5 (gauge length=7.62 mm). The strain rate was 1 mm/s. Data for networks formed by photoinduced free radical polymerization, thiol-acrylate Michael Addition, and free radical Michael addition are shown in FIG. 5.

Network curing was studied using a TA Instruments DHR-2 rheometer equipped with a Peltier plate. Experiments were conducted at constant temperatures (80° C. and 100° C.) and at a fixed oscillatory frequency of 1 Hz. The instrument was periodically calibrated by measuring the crossover modulus and crossover frequency of a silicone standard (TA Instruments 700.01011 PDMS Standard). A parallel plate (25 mm diameter) with a 1 mm gap was employed.

Results

Figure 2:
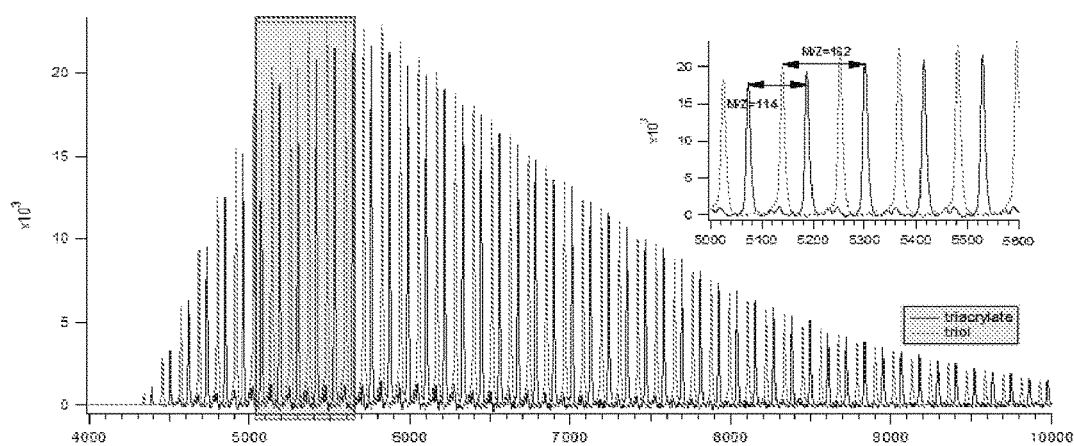
FIG. 2 displays the MALDI-TOF spectra of PCL-triol and the acrylated PCL prepolymer.

A three-arm poly(caprolactone) prepolymer was synthesized by ring-opening polymerization of caprolactone using glycerol as a tri-functional seed. Terminal hydroxyl groups were acrylated, and the molecular weight of the prepolymer was evaluated by $^1$H NMR end-group analysis and MALDI-TOF spectrometry to be about 6,200 g/mol (FIG. 2). This Thermal-induced free radical polymerization of the prepolymer's terminal acrylate groups resulted in PCL-FR networks. FT-IR analysis confirmed that acrylate groups were nearly completely consumed (FIG. 3), and the resulting networks possessed the highest gel fraction among networks studied (Table 1). The material was brittle and exhibited poor mechanical properties, which can be attributed to the high crosslink density and the network's poorly defined topology. The network contained trifunctional branch points from the prepolymer as well as multifunctional crosslinks from polymerization of acrylate end-groups. For the latter, the number of branches emanating from each crosslink is undetermined and is equal to the degree of polymerization at that site. Consequently, these crosslink sites can be very crowded.

To achieve a more uniform spatial distribution of net points with defined functionality, networks were prepared using base-catalyzed, thiol-acrylate coupling of prepolymers with multifunctional thiols. This reaction proceeds by the base catalyst first abstracting a thiol proton resulting in a thiolate anion, followed by addition of the anion to an electron-deficient double bond to yield a carbon-centered anion which finally rearranges and takes a proton from the conjugate acid to form a thiol-ether linkage (Nair D P et al. Chem Mater 2014, 26(1), 724-744). The use of thiol-acrylate chemistry to form networks also offers processing advantages including reduced oxygen sensitivity, delayed gelation, and the possibility of inductive curing (Ye S et al. Macromolecules 2011, 44(12), 4988-4996). The curing kinetics were studied using oscillatory shear rheometry.

Figure 7:
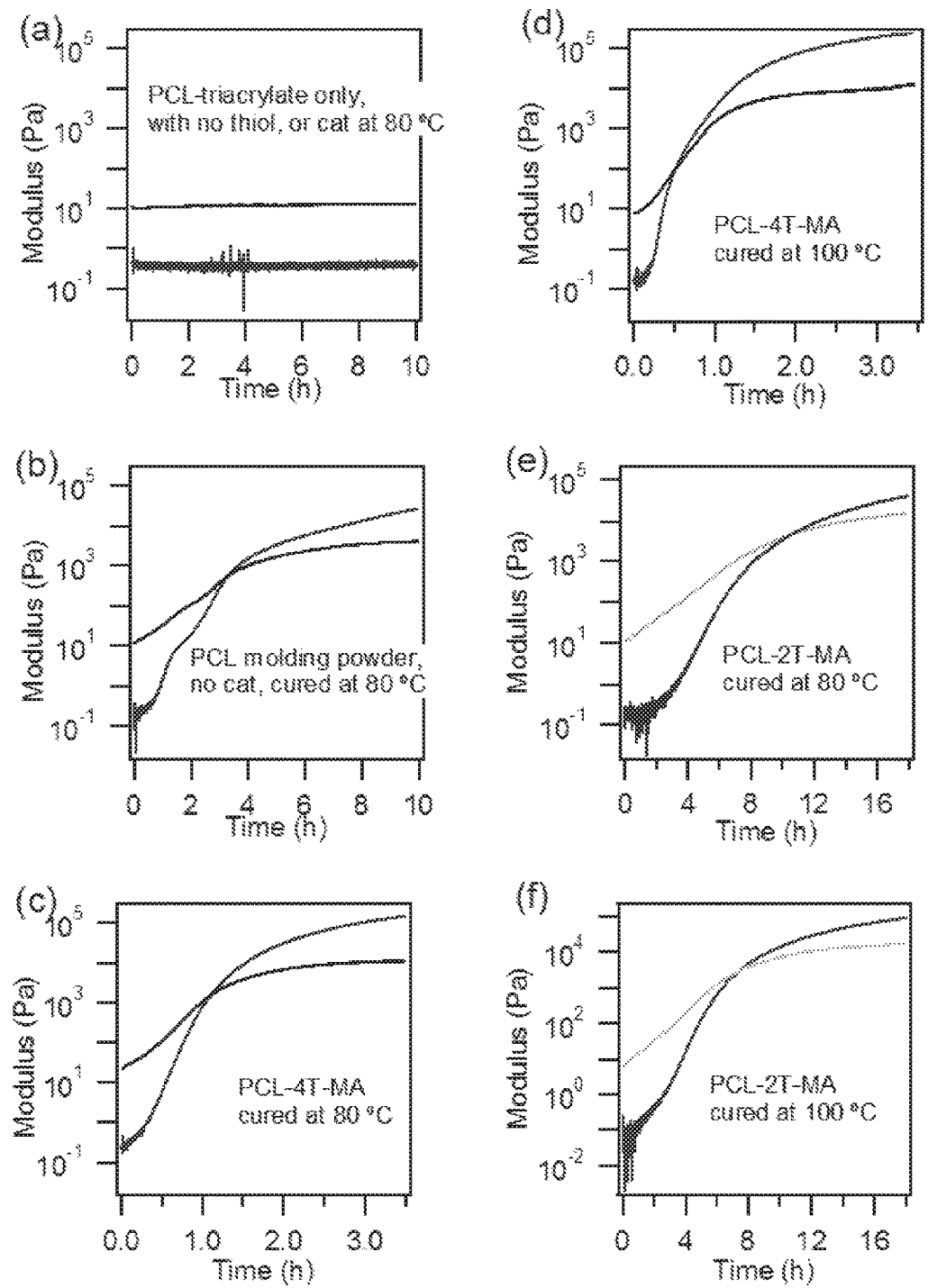
FIG. 7 displays the results from oscillatory rheology experiments conducted at 1 Hz during thermal curing of PCL-triacrylate via Michael Addition to form PCL networks: (graph a) control sample without thiol reagent or catalyst at 80° C.; (graph b) PCL-4T-MA without catalyst at 80° C.; (graph c) PCL-4T-MA with 1% wt. DMAP at 80° C.; (graph d) PCL-4T-MA with 1% wt. DMAP at 100° C.; (graph e) PCL-2T-MA with 1% wt. DMAP at 80° C.; (graph f) PCL-2T-MA with 1% wt. DMAP at 100° C.

The evolution of storage and loss modulus during cure under different conditions is shown in FIG. 7. The gel time was determined as the elapsed time before crossover of the storage and loss modulus. Modulus profile of pure PCL-triacrylate prepolymer, without curing reagents, remain unchanged over a 10-hour heating period at 80° C. This shows stability against spontaneous polymerization of prepolymer ends that may occur during storage. Before mixing with curing agents, the prepolymer is a solid and can be treated as a molding powder. When the prepolymer was cured with stoichiometric amounts of tetrafunctional thiol (PETMP), the PCL-4T-MA network formed after about 3.5 hours. From a processing standpoint, this is ample time to process into a desired permanent shape. The addition of 1.0 wt % of catalyst DMAP accelerated gel formation to 1.1 hours. Curing with 1.0 wt % at an even higher temperature of 100° C. further accelerated gel formation to about 0.5 hours. The curing kinetics of PCL-2T-MA system showed similar dependence on curing temperature; however, the gelation time was longer (~10 hours), due to the decreased functionality of the thiol reagent from four to two.

Both PCL-4T-MA and PCL-2T-MA networks exhibited high gel fractions (~99%), although FT-IR analysis (FIG. 3) showed small amounts of unreacted acrylate groups, indicating some dangling ends were present. Both networks contained trifunctional branch points from the prepolymer. PCL-4T-MA also contained tetrafunctional net points, whereas PCL-2T-MA contained linear linkages, effectively doubling the chain length between tri-functional branch points. Due to its higher crosslink density, PCL-4T-MA displayed low elongation-at-break, and in the rubbery state ($T>T_m$) it is much stiffer than PCL-2T-MA. At room temperature the opposite was true: PCL-2T-MA exhibited the highest modulus (E'=334 MPa), which can be attributed to its higher crystallinity arising from fewer branch points.

Radical induced, thiol-acrylate coupling of stoichiometric mixtures was also conducted to achieve PCL-2T-FR networks. The formed network's mechanical properties were intermediate to those of PCL-FR and PCL-2T-MA. Generated free radicals can facilitate thiol-acrylate coupling, but they can also initiate acrylate polymerization resulting in ill-defined distribution of crosslinks. In an ideal free-radical thiol-ene reaction, initiated free radicals result in thiyl radicals which add to ene moieties to create radical intermediates [R—S—C=C—R']. Homopolymerization can be avoided if transfer of radical intermediates to unreacted thiols is favored over propagation by addition to an acrylate's ene moiety (Hoyle C E and Bowman C N. *Angew Chem Int Edit* 2010, 49(9), 1540-1573).

Figure 8:
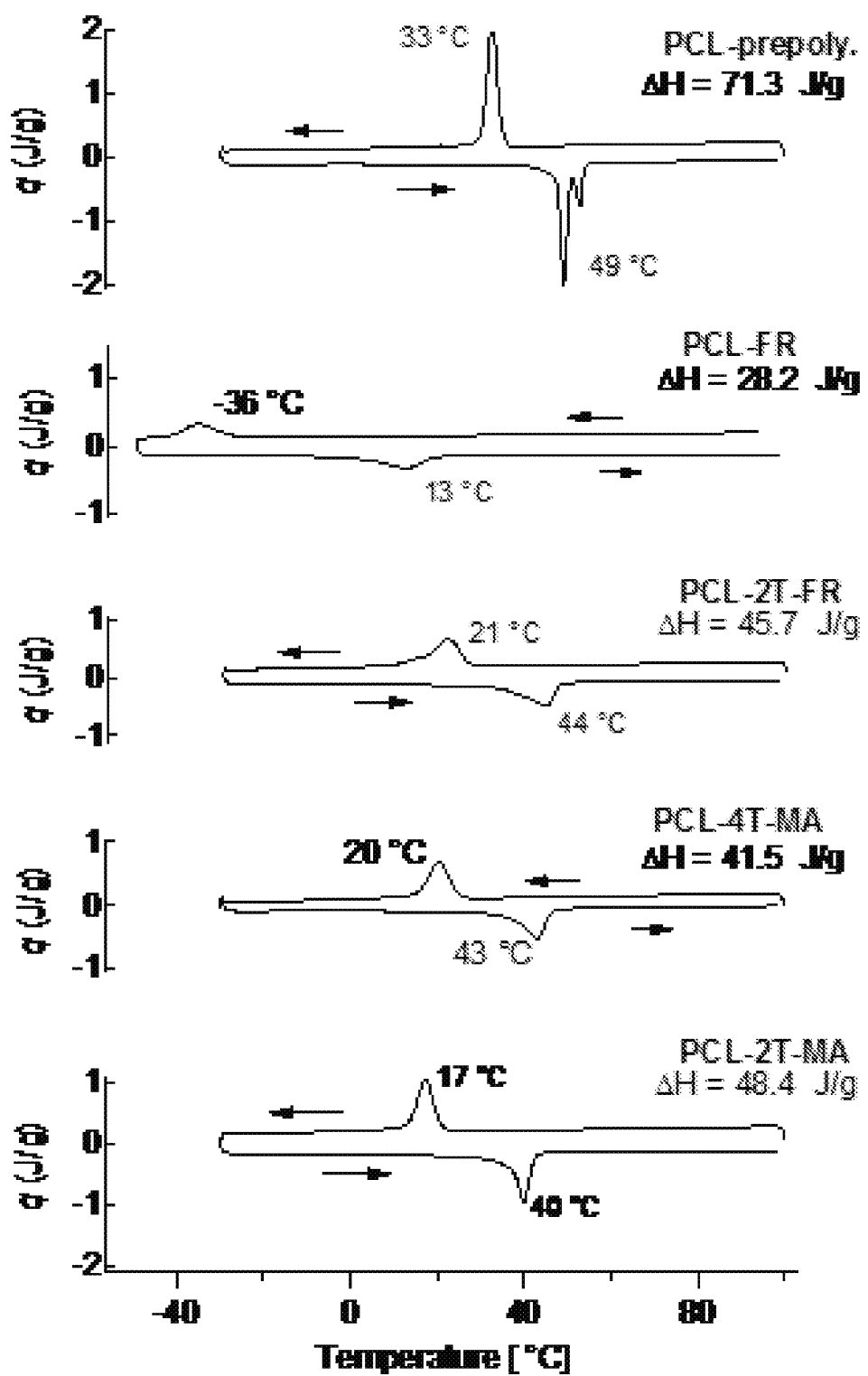
FIG. 8 displays DSC cooling and second heating scans (5° C./min) of the tri-arm prepolymer and poly(caprolactone) networks formed by free radical polymerization of acrylate end-groups (PCL-FR), radical induced thiol-acrylate coupling (PCL-2T-FR), and thiol-acrylate Michael addition (PCL-2T-MA & PCL-4T-MA). Exothermic heat flow (q) corresponds to the positive ordinate direction. The reported enthalpy changes are averages of the integrated peak intensities corresponding to melting and crystallization.

Network crystallization can be sensitive to the type of network structure, as indicated by the data in FIG. 8. The prepolymer exhibited sharp crystallization and melting transitions. Based on melting of fully crystalline PCL ($\Delta H_m$=135 J/g) (Crescenzi V et al. *Eur Polym J* 1972, 8(3), 449-&), the prepolymer's degree of crystallinity is X=0.53. When acrylate end-groups were polymerized (PCL-FR), the degree of crystallinity dropped to X=0.21, and the melting and crystallization transition temperatures were reduced. These trends can be attributed to PCL-FR's topologically frustrated network. Strands emanate from crosslinks sites and are covalently bound by their ends. Strands can be highly entangled and can be unable to easily sample their configurational space. In comparison, PCL-2T-MA, prepared using thiol-acrylate Michael addition, exhibited higher crystallinity (X=0.36). Moreover, all networks formed by Michael Addition displayed sharp and unimodal thermal transitions which were consistent with a uniform network topography. Cold-drawing and shape memory studies, discussed below, focused on PCL-2T-MA because of its crystallization kinetics and mechanical properties.

The scan of PCL-2T-FR, with the possibility of concurrent free radical polymerization, displayed a bimodal crystallization endotherm. The shoulder at lower temperatures coincides with PCL-2T-MA's endotherm, suggesting some chains form well-defined thiol-acrylate sub-structures. However, the more intense part of the peak appeared at a slightly higher temperature (21° C.), indicating that many chains are less constrained and can crystallize more easily. Some end-groups may have experienced free radical polymerization, causing a stoichiometric excess of thiol reactive groups, resulting in free ends.

Strain-induced crystallization of PCL-2T-MA was studied by cold-drawing at different rates. Samples were drawn to 400% strain at 3, 30, and 300 mm/min. After drawing, the load was immediately removed, except for one test where the strain was maintained for an additional ten minutes. The strain fixities, $\varepsilon_f$, following cold-drawing were all between 66-72% for samples immediately unloaded, and the sample held at maximum strain for extra time showed a somewhat higher fixity of 84%. These results are in agreement with a study by Wong and coworkers on uncrosslinked biodegradable shape memory polymers (Wong Y S et al. *J Biomat Sci-Polym E* 2008, 19(2), 175-191). They observed the highest fixities when a lower stress was applied for a longer duration.

Figure 9:
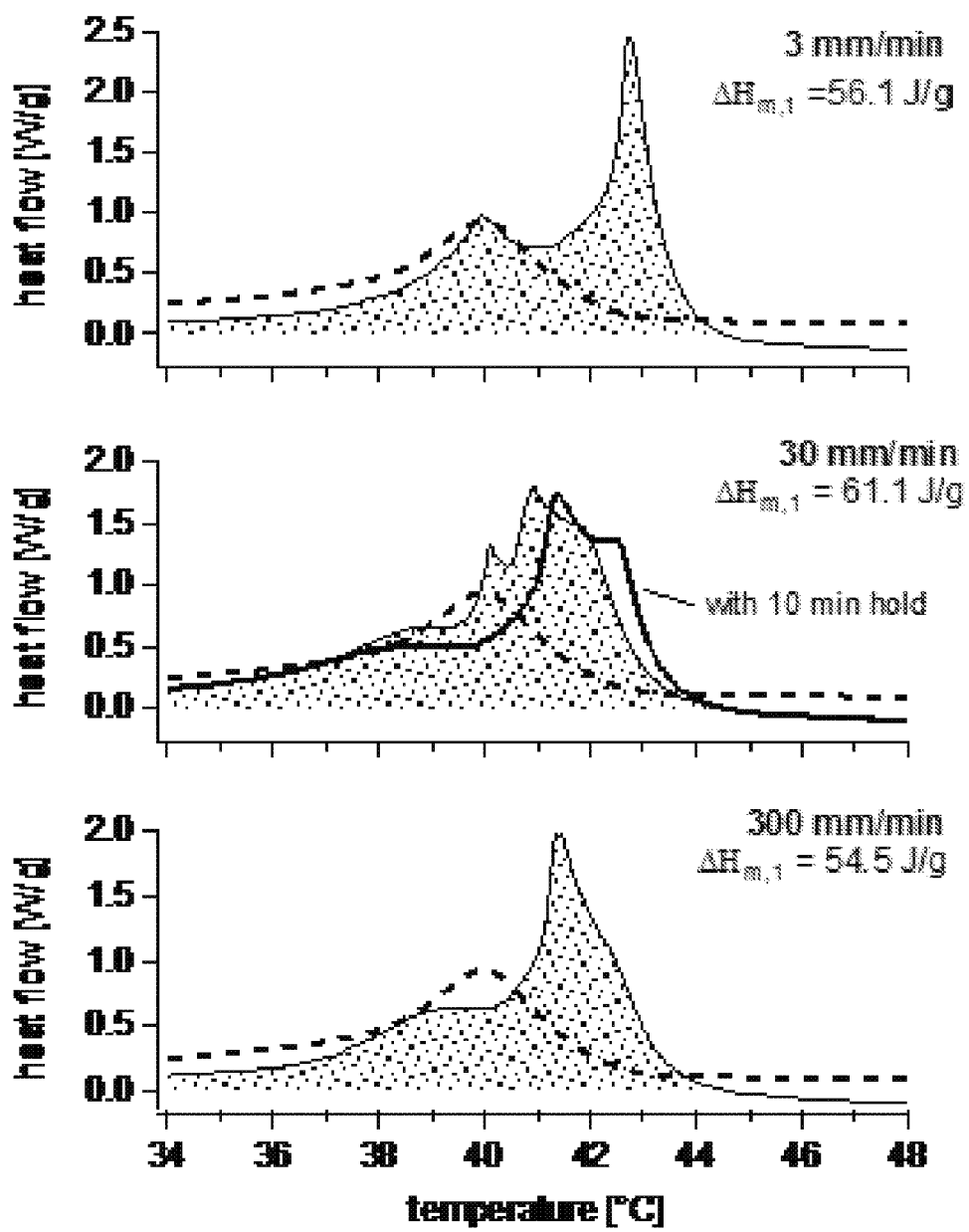
FIG. 9 displays the influence of cold-draw rate on melting for PCL-2T-MA: DSC heating scans (5° C./min) and melting enthalpies for specimens cold-drawn at 3, 30, and 300 mm/min. The bold solid line the middle plot was obtained after hold the cold-drawn sample for 10 minutes at 400% strain.

The DSC heating scans displayed in FIG. 9 were acquired within four hours of cold-drawing to 400% strain. Although cold-drawing did not substantially change the degree of crystallinity, it shifted a part of the melting transition to higher temperatures. This effect is most pronounced at the slowest draw rate (3 mm/min) because the cold-drawing process takes more time, allowing additional strain-induced recrystallization to occur. This can explain why the cold-drawn sample held at 400% strain for ten additional minutes showed the most elevated melting temperature and a higher level of shape fixity (strain fixity).

Mechanistically, cold-drawing a PCL-rich material just beneath its melting point can reorient and disrupt small crystallites and can substantially stretch network strands, removing configurational entropy (Kamal T et al. *Macromolecules* 2012, 45(21), 8752-8759). The amount of entropy lost upon forming a crystal ($\Delta S_m$) can be lessened, causing an increase in the melting point, $T_m=\Delta H_m/\Delta S_m$ and, consequently, new crystals can form.

Figure 10:
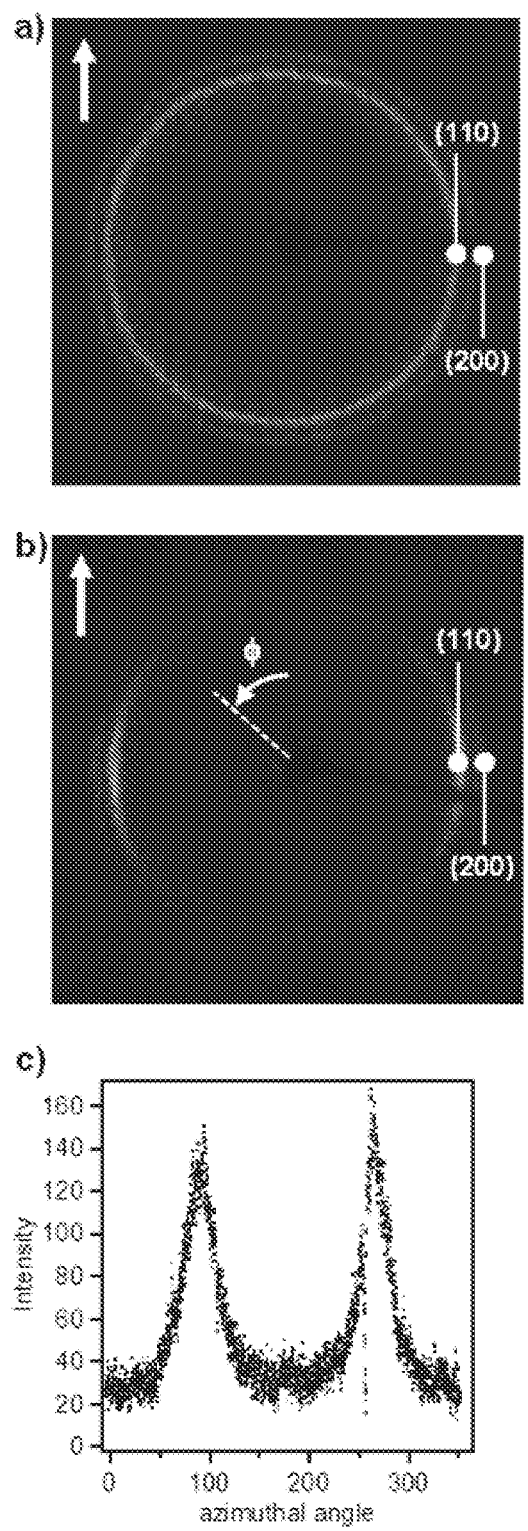
FIG. 10 displays the determination of unit cell orientation and the degree of order following cold-drawing of PCL-2T-MA: two-dimensional WAXS data of (graph a) unoriented samples and (graph b) samples cold-drawn to 400% strain, and (c) azimuthal variation of scattered intensity from the (110) plane. The arrows on the WAXS images indicate the cold-draw direction.

PCL can crystallize in an orthorhombic unit cell with polymer chains oriented parallel to the c-axis (Bittiger H et al. *Acta Crystall B-Stru* 1970, B 26, (December 15), 1923-&; Hu H L and Dorset D L. *Macromolecules* 1990, 23(21), 4604-4607). The orientation of crystal unit-cells with respect to the draw direction was probed using Wide-Angle X-ray Scattering (WAXS). FIG. 10 shows orientation arcs for the two most prominent planes, the (110) and (200) planes. There is variation in intensity along the azimuthal angle φ, i.e. the angle between the cold-draw direction and the diffraction planes. The azimuthal position of both the (110) and the (200) arcs at the equator indicates that the c-axis of oriented unit cells is parallel to the draw direction.

The degree of orientation was further analyzed by considering the azimuthal variation of diffracted X-rays from the (110) plane near 2θ=21.5°, also shown in FIG. 10. Unfortunately, diffraction from the (110) planes convolutes with scattering from amorphous material. To separate these contributions, amorphous scattering can be assumed to be about the same at slightly lower angles (14.7°<2θ<19.8°), where strong Bragg peaks are absent. Then, the corrected azimuthal variation of intensity arising from the (110) planes can be analyzed with Hermans' orientation function (Spruiell J E and White J L, *Polymer Engineering and Science* 1982, 23(5), 247-256). The resulting orientation factor can then be calculated as:

$$f_{110} = \frac{(3(\cos\phi)^2 - 1)}{2} \qquad [1]$$

where $$\langle \cos\phi \rangle = \frac{\int_0^\pi I_{110}(\phi)\cos^2\phi \sin\phi d\phi}{\int_0^\pi I_{110}(\phi)\sin\phi d\phi}. \quad [2]$$

This analysis shows that $f_{110} \sim -0.30$ for the cold-drawn sample, indicating that the normal vectors to the (110) planes are preferentially oriented perpendicular to the draw-direction.

Figure 11:
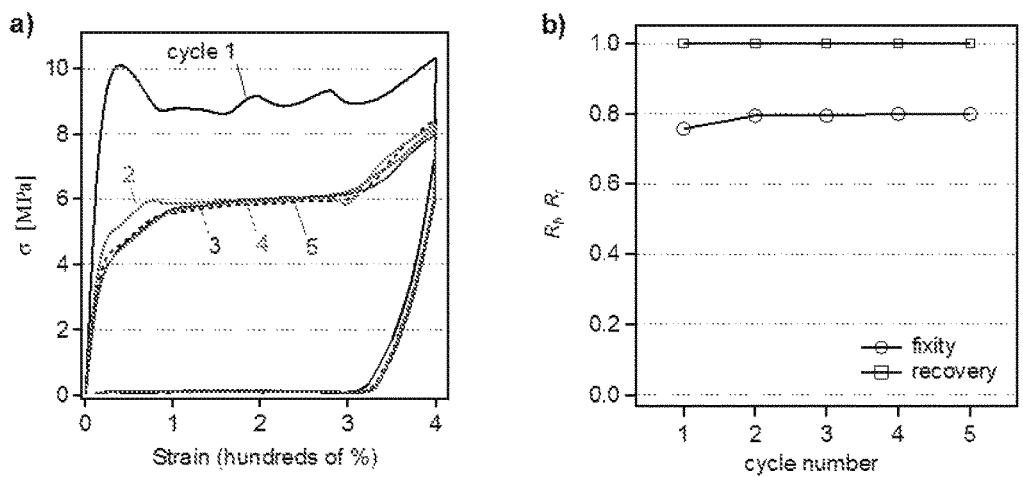
FIG. 11 displays the shape memory performance of PCL-2T-MA networks: (graph a) stress-free shape memory cycles; and (graph b) shape fixity (strain fixity) and recovery ratios plotted against cycle number.

PCL-2T-MA, with its well defined network formed by base-catalyzed Michael Addition, exhibited shape-memory properties. Results from a typical stress-free shape-memory experiment are shown in FIG. 11. A sample was drawn at 30 mm/min to 400% strain at room temperature, held for five minutes to allow for crystal reformation, and then the load was released. After thirty seconds, the sample was heated to 60° C. to allow for recovery. The stress required for cold-drawing in the first cycle was higher than subsequent cycles because the sample initially had a high degree of crystallization. Subsequent cycles were held at room temperature for only ten minutes, and longer hold times resulted in higher cold-draw stresses. All cycles demonstrated high shape-fixity and nearly complete shape-recovery. The high shape-fixity can be attributed to facile crystallization of the uniform network strands when they are elongated. The shape recovery can be attributed to the permanent, covalent network with a unimodal chain-length distribution that can allow all chains to more equally deform at high strain.

Slow-unload shape-memory cycles were performed to assess the capacity of the fixed shape to store elastic energy. Samples were strained at 30 mm/min to 400% of the gauge length and held for five minutes. After thirty seconds, the recovery strain was held constant while the sample was heated to 60° C. for 70 seconds, causing a stress to develop. During this heating time period, crystalline domains began to melt, and seventy seconds was chosen to optimize the release of stored elastic energy. This demonstrates the capability of the material to store and release elastic energy. The sample was then unloaded at a rate of 0.5 MPa/min allowing the sample to perform a measurable amount of work as it retracted. Upon reaching a zero-stress condition, the crosshead was returned to its original zero-strain value, and the sample was allowed to continue to recover and crystallize at room temperature for ten minutes before starting the subsequent cycle.

Figure 12:
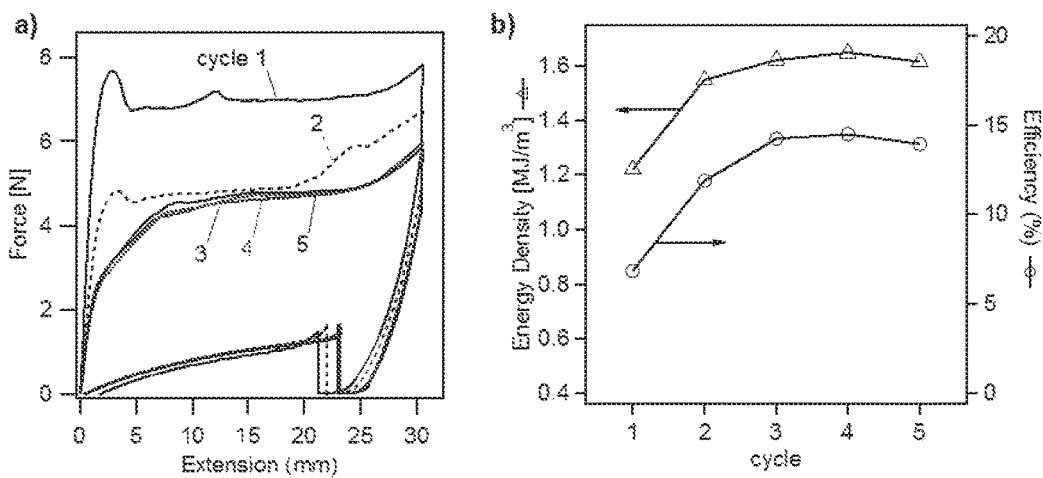
FIG. 12 displays the measurement of energy storage capacity for PCL-2T-MA: (graph a) slow-unload shape memory cycles, and (graph b) a plot of stored elastic energy density and efficiency plotted against cycle number.

The energy storage capacities of each cycle (FIG. 12, graph b) were calculated by integrating force-versus-extension curves (FIG. 12, graph a) during the shape-recovery phase and dividing the result by the sample volume. The energy efficiency of each cycle could be calculated based on the ratio of the amount of work recovered to the amount of work input during cold-drawing. The measured energy storage capacities of PCL-2T-MA exceeded 1.5 MJ/m³, which corresponds to an efficiency of about 13%. These values are among the highest reported for shape memory polymer that are fixed at around 300% strain (Anthamatten, M et al. *Macromolecules* 2013, 46(10), 4230-4234). The measured energy storage capacity can be affected by the following process parameters: (i) time the sample was held in the elongated state, (ii) the time the sample was heated while maintaining constant elongation, and (iii) the rate that the sample was unloaded.

Well-defined shape memory networks were formed by base-catalyzed reaction of acrylate terminated poly(caprolactone)s with multifunctional thiols. Resulting networks exhibited shape-memory properties, including cold-drawability, high shape fixity (strain fixity), shape recovery, and a capacity to store elastic energy. These shape-memory properties can be attributed to the network's high density of crystallizable chains, its homogeneous topography, and its uniform chain-length distribution. In contrast, networks prepared by free radical polymerization of acrylate end-groups did not show such shape memory properties.

During cold-drawing, PCL networks reform crystals that exhibit heightened thermal stability, and the polymer chains within the crystalline unit cells are oriented predominantly along the cold-draw direction. The measured energy storage capacity is dependent on its elastic stress-strain history.

The methods and compositions of the appended claims are not limited in scope by the specific methods and compositions described herein, which are intended as illustrations of a few aspects of the claims and any methods and compositions that are functionally equivalent are within the scope of this disclosure. Various modifications of the methods and compositions in addition to those shown and described herein are intended to fall within the scope of the appended claims. Further, while only certain representative methods, compositions, and aspects of these methods and compositions are specifically described, other methods and compositions and combinations of various features of the methods and compositions are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A shape-memory polymer comprising: a branched or telechelic prepolymer having low polydispersity and crosslinks with a multifunctional crosslinker, wherein the branched or telechelic prepolymer is crosslinked to the multifunctional crosslinker by a Michael addition reaction and wherein substantially none of the crosslinks are the reaction product of a free radical polymerization reaction.

2. The shape-memory polymer of claim 1, wherein the branched or telechelic prepolymer is crosslinked to the multifunctional crosslinker by a base-catalyzed Michael addition reaction.

3. The shape-memory polymer of claim 1, wherein the branched prepolymer is present and comprises 3 or more branches.

4. The shape-memory polymer of claim 1, wherein the branched prepolymer is present and each branch of the branched prepolymer is substantially the same molecular weight.

5. The shape-memory polymer of claim 1, wherein the molecular weight of each branch of the branched prepolymer or the telechelic prepolymer is 10,000 g/mol or less.

6. The shape-memory polymer of claim 1, wherein the branched or telechelic prepolymer comprises a semi-crystalline polymer, a poly(caprolactone), acrylate or allyl end groups, or a combination thereof.

7. The shape-memory polymer of claim 1, wherein the multifunctional crosslinker comprises 2-6 reactive groups, a multifunctional thiol, or a combination thereof.

8. The shape-memory polymer of claim 1, wherein the shape-memory polymer has an elastic energy density of 0.5 MJ/m³ or more, an energy storage efficiency of 2% or more, or a combination thereof.

9. The shape-memory polymer of claim 1, wherein the shape-memory polymer has a Young's modulus at room temperature of 180 MPa or more, a Young's modulus at 70° C. of 0.3 MPa or more, or a combination thereof.

10. The shape-memory polymer of claim 1, wherein the shape-memory polymer has a strength of 5 MPa or more, a degree of crystallinity of 0.4 or more, a strain fixity of 65% or more, a stress free or unconstrained shape recovery ratio of 0.9 or more, or a combination thereof.

11. A method of making the shape-memory polymer of claim 1, comprising: crosslinking stoichiometric amount of a multifunctional crosslinker with a branched or telechelic prepolymer having a low polydispersity in the substantial absence of free radicals, wherein the branched or telechelic prepolymer is crosslinked to the multifunctional crosslinker by a Michael addition reaction.

12. The method of claim 11, wherein the branched or telechelic prepolymer comprises acrylate or allyl end groups, the multifunctional crosslinker comprises a multifunctional thiol, and crosslinking the branched or telechelic prepolymer comprises base-catalyzed Michael addition of the acrylate or allyl end groups with the multifunctional thiol.

13. The method of claim 11, further comprising stretching the shape-memory polymer having an unstretched length to form a stretched shape-memory polymer having a post-stretched length.

14. The method of claim 13, wherein the post-stretched length is from 200% to 800% longer than the unstretched length.

15. The method of claim 13, wherein stretching the shape-memory polymer is performed at a rate greater than 10% strain per minute.

16. The method of claim 13, wherein the stretched shape-memory polymer is held at the post-stretched length for at least one minute.

17. The method of claim 13, wherein the stretched shape-memory polymer is held at the post-stretched length for at least one minute at a temperature below the melting transition temperature of the shape-memory polymer.

18. The method of claim 13, further comprising heating the stretched shape-memory polymer to a temperature above the melting temperature of the shape-memory polymer.

* * * * *